United States Patent [19]

Liu et al.

[11] Patent Number: 4,755,200
[45] Date of Patent: Jul. 5, 1988

[54] FEED GAS DRIER PRECOOLING IN MIXED REFRIGERANT NATURAL GAS LIQUEFACTION PROCESSES

[75] Inventors: Yu-Nan Liu, Whitehall; Charles L. Newton, Bethlehem, both of Pa.

[73] Assignee: Air Products and Chemicals, Inc., Allentown, Pa.

[21] Appl. No.: 20,286

[22] Filed: Feb. 27, 1987

[51] Int. Cl.$^4$ ................................................. F25J 3/00
[52] U.S. Cl. ......................................... 62/11; 62/335; 62/434
[58] Field of Search ........................ 62/9, 11, 335, 434

[56] References Cited

U.S. PATENT DOCUMENTS

| | | | |
|---|---|---|---|
| 3,300,991 | 1/1967 | Carney | 62/335 |
| 3,418,819 | 12/1968 | Grunberg et al. | 62/335 |
| 3,817,046 | 6/1974 | Aoki et al. | 62/335 |
| 3,964,891 | 6/1976 | Krieger | 62/9 |
| 4,112,700 | 9/1978 | Förg | 62/28 |
| 4,274,849 | 6/1981 | Garier et al. | 62/9 |
| 4,339,253 | 7/1982 | Caetani et al. | 62/40 |
| 4,525,185 | 6/1985 | Newton | 62/11 |

OTHER PUBLICATIONS

"Liquefaction of Associated Gases", Paradowski & Sguera–(7th International Conference on LNG, May 15–19, 1983) (Abstract in English).

Primary Examiner—Ronald C. Capossela
Attorney, Agent, or Firm—Willard Jones, II; James C. Simmons; William F. Marsh

[57] ABSTRACT

A closed loop single component, e.g. propane or Freon refrigerant, refrigeration cycle is added to a single or dual mixed refrigerant natural gas liquefaction process to precool the natural gas prior to adsorptive drying. By means of pressure control, the single component refrigerant temperature can be accurately controlled to ensure against hydrate formation in the natural gas feed and to maximize the precooling of the natural gas feed prior to drying. The addition of the single component refrigeration cycle overcomes the difficulty of controlling the precooling temperature which occurs when cooling by a multicomponent refrigerant, and thus improves plant reliability and minimizes the equipment sizes associated with the drying operation.

12 Claims, 3 Drawing Sheets

FEED GAS DRIER PRECOOLING IN MIXED REFRIGERANT NATURAL GAS LIQUEFACTION PROCESSES

TECHNICAL FIELD

The present invention is directed to a process for the liquefaction of natural gas or other methane-rich gas streams. The invention is more specifically directed to the addition of a closed-loop single component, e.g. propane or freon, refrigeration cycle to a single or dual mixed component refrigerant liquefaction process to precool the feed.

BACKGROUND OF THE PRIOR ART

The recovery and utilization of natural gas and other methane-rich gas streams as economic fuel sources have required the liquefaction of the gas in order to provide economic transportation of the gas from the site of production to the site of use. Liquefaction of large volumes of gas is obviously energy intensive. In order for natural gas to be available at competitive prices the liquefaction process must be reliable and as energy efficient as possible.

Inefficiencies in liquefaction processes are usually present when the compression load on the refrigeration equipment used to perform the liquefaction is not balanced on the drivers or electric motors used to run the equipment in a single component refrigerant cycle, specifically when such equipment is matched throughout the liquefaction installation. Compression load is the major power consuming operation of a liquefaction process. In addition, a liquefaction process must be readily adaptable to varying regions with their specific climatic conditions. Such climatic conditions may also vary seasonally particularly in the more polar extreme regions of the world. Such climatic conditions affect a liquefaction process predominantly in the temperature of the cooling air or water utilized in the production of refrigeration used to liquefy the natural gas. The sizeable variations in the temperature of available cooling air or water due to changing seasons or different climatic zones can cause imbalances in the various refrigeration cycles.

Other inefficiencies may also arise aside from the matching of compression load with compression drivers in the refrigeration cycles. Such inefficiencies usually reside in the matching of gas to be liquefied against refrigerant to perform the liquefaction. For a multicomponent staged flash cycle, compositional variations and constraints have plagued those skilled in the art.

Various attempts have been made to provide efficient liquefaction processes, which are readily adaptable to varying ambient conditions and multiple component, multiple cycle refrigerant processes. In U.S. Pat. No. 4,112,700 a liquefaction scheme for processing natural gas is set forth wherein two closed cycle refrigerant streams are utilized to liquefy natural gas. A first high level (higher temperature) precooling refrigerant cycle is utilized in multiple stages to cool the natural gas. The refrigerant is not initially condensed totally against cooling water. This first high level precool refrigerant is phase separated in multiple stages, wherein the effect is to return the light component portions of the refrigerant for recycle, while the heavy component portions of the refrigerant are retained to perform the cooling at lower temperatures of the natural gas. The first high level precool refrigerant is also utilized to cool the second low level (lower temperature) refrigerant. The second low level refrigerant performs the liquefaction of the natural gas in a single stage. The drawback in this process is that the high level precooling refrigerant after initial phase separation utilizes heavier and heavier molecular weight components to do lower and lower temperature cooling duty. Further, the second or low level refrigerant is used in a single stage to liquefy the natural gas, rather than performing such liquefaction in multiple stages. Finally, the high level refrigerant is not totally condensed against external cooling fluid prior to its refrigeration duty.

U.S. Pat. No. 4,274,849 discloses a process for liquefying a gas rich in methane, wherein the process utilizes two separate refrigeration cycles. Each cycle utilizes a multicomponent refrigerant. The low level (lower temperature) refrigerant cools and liquefies the natural gas in two stages by indirect heat exchange. The high level (higher temperature) refrigerant does not heat exchange with the natural gas to be liquefied, but cools the low level refrigerant by indirect heat exchange in an auxiliary heat exchanger. This heat exchange is performed in a single stage.

U.S. Pat. No. 4,339,253 discloses a dual refrigerant liquefaction process for natural gas, wherein a low level refrigerant cools and liquefies natural gas in two stages. This low level refrigerant is, in turn, cooled by a high level refrigerant in a single stage. The high level refrigerant is used to initially cool the natural gas only to a temperature to partially condense moisture therefrom before feeding the dry natural gas to the main liquefaction area of the process. The use of such individual stage heat exchange between the cycles of a dual cycle refrigerant liquefaction process precludes the opportunity to provide closely matched heat exchange between the cycles by the systematic variation of the refrigerant compositions when the refrigerants constitute mixed component refrigerant.

In the literature article Paradowski, H. and Squera, O., "Liquefaction of the Associated Gases", Seventh International Conference on LNG, May 15–19, 1983, a liquefaction scheme is shown in FIG. 3 wherein two closed refrigeration cycles are used to liquefy a gas. The high level cycle depicted at the right of the flowscheme is used to cool the low level cycle as well as cool for moisture condensation an initial gas stream. The high level refrigerant is recompressed in multiple stages and cools the low level refrigerant in three distinct temperature and pressure stages. Alteration of the high level refrigerant composition to match the various stages of refrigeration in the heat exchanger is not contemplated.

U.S. Pat. No. 4,525,185 discloses a process for liquefying natural gas using two closed-cycle, multicomponent refrigerants; a low level refrigerant which cools the natural gas and a high level refrigerant which cools the low level refrigerant wherein the improvement comprises phase separating the high level refrigerant after compression and fully liquefying the vapor phase stream against external cooling fluid after additional compression.

Unfortunately, the above processes either ignored the problem of hydrate formation or resulted in processes which were ineffective at maximizing feed precooling while controlling temperature to avoid hydrate formation.

BRIEF SUMMARY OF THE INVENTION

The present invention relates an improvement to a process for the liquefaction of natural gas which utilizes either a single multicomponent refrigeration cycle or a dual multicomponent refrigeration cycle. The improvement to the process is the precooling of the natural gas feedstream with a single component refrigerant provided by a closed loop refrigeration cycle, so as to prevent the formation of hydrates in the natural gas feedstream while yet maximizing the condensation and subsequent removal of water from the feedstream. The precooling of the natural gas feedstream is accomplished by indirect heat exchange of the feedstream with the boiling single component refrigerant. Temperature control of the precooling, which is critical to prevent formation of hydrates, is accomplished by controlling the pressure of the boiling refrigerant in the precooler. The vaporized refrigerant removed from the precooler can be optionally compressed and then is condensed by indirect heat exchange with a multicomponent refrigeration cycle. Alternatively, the single component can be condensed against the multicomponent refrigerant and pumped to the feed precooler. A third option is to both compress and pump the single component. In any case the vaporized single component refrigerant must be condensed and increased in pressure prior to returning it to the precooler. Once condensed the liquefied single component refrigerant is flashed and returned to the precooler as recycle. The improvement is applicable to any single or dual multicomponent refrigeration cycle liquefaction processes.

DETAILED DESCRIPTION OF THE INVENTION

The present invention will be described in greater detail with reference to the accompanying drawings wherein several preferred embodiments of operation of the present invention are set forth.

Figure 1:
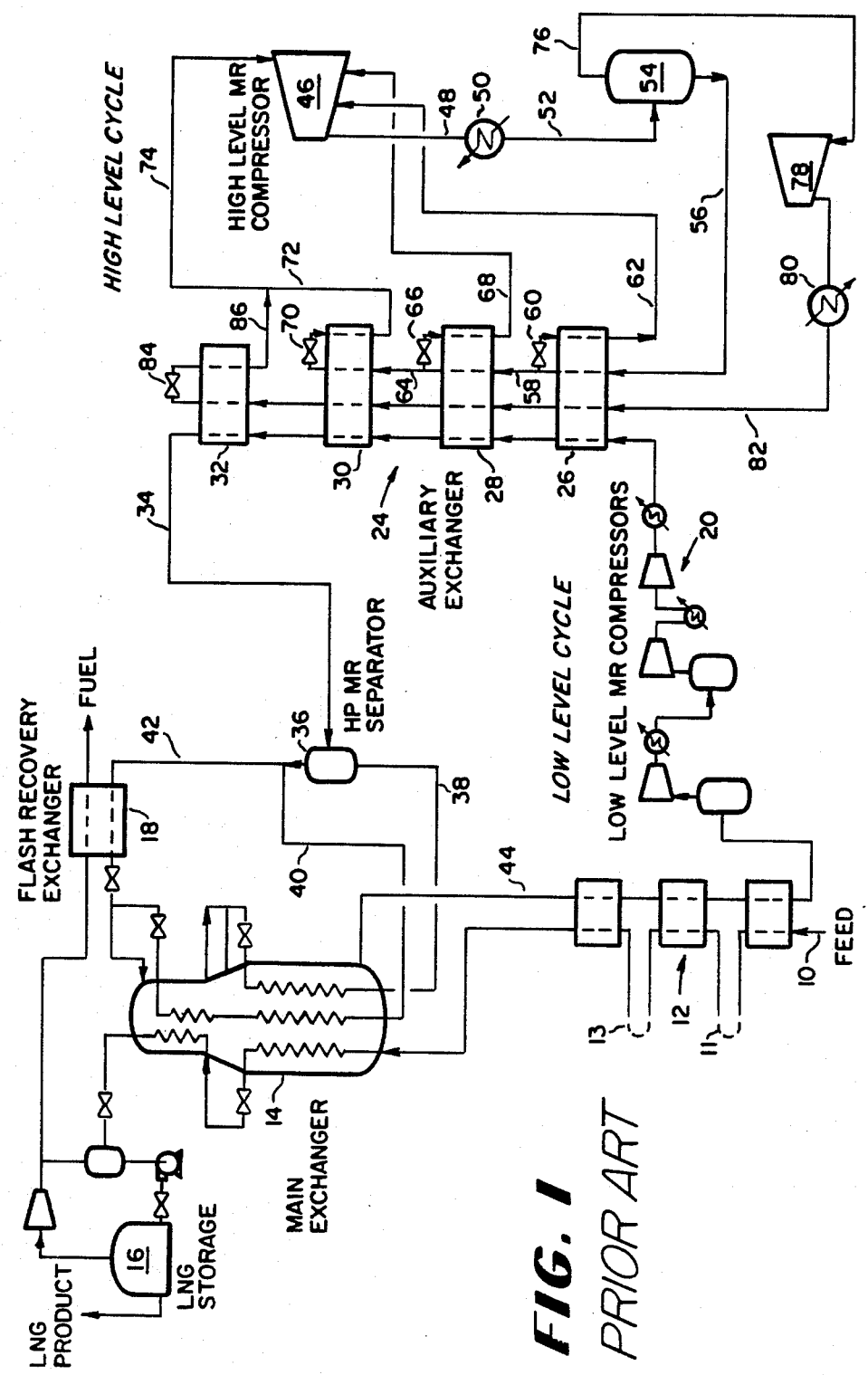
FIG. 1 is a flowscheme of the prior art, dual multicomponent refrigerant cycle, natural gas liquefier as disclosed in U.S. Pat. No. 4,545,185.

However, to better understand the process of the present invention, it is important to understand the closest prior art process, i.e. the process of U.S. Pat. No. 4,525,185. With reference to FIG. 1, a natural gas feed stream is introduced into the process in line 10. The natural gas would typically have a composition as follows:

$C_1$:91.69%
$C_2$:4.56%
$C_3$:2.05%
$C_4$:0.98%
$C_{5+}$:0.43%
$N_2$:0.31%

This feed is introduced at approximately 93° F. and over 655 psia. Prior to liquefaction, a significant portion of the hydrocarbons heavier than methane must be removed from the feedstream. In addition, any residual moisture content must also be removed from the feedstream. These preliminary treatment steps are well known in the prior art. Therefore, they will not be dealt with in the present description. Suffice it to say that the feedstream in line 10 is subjected to initial cooling by heat exchange in heat exchanger 12 against a low level (low temperature) refrigerant in line 44. The precooled natural gas is circuited through drying and distillation apparatus to remove moisture and higher hydrocarbons. This standard clean-up step is not shown in the drawing other than to indicate that it is generally done prior to liquefaction at stations 11 and 13.

The natural gas, now free of moisture and significantly reduced in higher hydrocarbons, is fed to the main heat exchanger 14 which preferably consists of a two bundle coil wound heat exchanger. The natural gas is cooled and totally condensed in the first stage or bundle of the main heat exchanger 14. The liquefied natural gas is then subcooled to a temperature of approximately −240° F. in the second stage or bundle of the exchanger 14. The liquefied natural gas then leaves the exchanger, is flashed through a valve and is phase separated to provide flash gas and product liquefied natural gas which is pumped to a storage containment 16. LNG product can then be removed as desired. Vapor forming over the stored LNG is compressed to pressure and combines with the flash gas to be rewarmed in flash gas recovery exchanger 18 before being used as fuel.

The process of FIG. 1 involves the liquefaction of natural gas using two closed cycle refrigerants. A low level refrigerant cycle provides the lowest temperature level of refrigerant for the liquefaction of the natural gas. The low level (lowest temperature) refrigerant is in turn cooled by high level (relatively warmer) refrigerant in a separate heat exchange between the low level refrigerant and the high level refrigerant.

The low level multicomponent refrigerant, which actually performs the cooling, liquefaction and subcooling of the natural gas, is typically comprised of nitrogen, methane, ethane, propane and butane. The exact concentration of these various components in the low level refrigerant is dependent upon the ambient conditions and particularly, the temperature of external cooling fluids, which are used in the liquefaction plant and the natural gas feed comosition. The exact composition and concentration range of the components of the low level refrigerant is also dependent upon the exact power shift or balance desired between the low level refrigerant cycle and the high level refrigerant cycle.

The low level refrigerant is compressed in multiple stages and aftercooled against external cooling fluid in compressor assembly 20. Ambient cooling fluid, such as sea water, is usually utilized to remove the heat of compression.

The low level refrigerant at approximately 103° F. and 634 psia is further cooled against high level refrigerant in a multistage auxiliary heat exchanger 24. In its preferred embodiment, the auxiliary heat exchanger 24 has four stages, warm stage 26, intermediate stage 28, intermediate stage 30 and cold stage 32. The low level refrigerant exits the auxiliary heat exchanger 24 partially liquefied in line 34. The low level refrigerant is then phase separated in separator vessel 36 at a cut temperature of approximately −50° F. The liquid phase of the low level refrigerant is removed in line 38 and introduced into the first bundle of the main heat exchanger 14 for further cooling before being removed from the exchanger, reduced in temperature and pressure through a valve and reintroduced at approximately −200° F. into the shell side of the exchanger as a spray which descends over the various tubes in the first bundle of the main heat exchanger. The vapor phase stream from separator 36 is split into a slipstream 42 and the main vapor stream 40. The main vapor stream 40 is also introduced into the main heat exchanger 14 in the first bundle and continues through the second bundle where it is fully liquefied and subcooled before it is removed for reduction in temperature and pressure through a valve. The slipstream of the vapor phase in line 42 passes through flash recovery heat exchanger 18 to recover refrigeration duty from the flash natural gas. This stream is also reduced in temperature and pressure and is combined with the stream in line 40 and is introduced into the overhead of the main heat exchanger 14 at approximately −240° F. as a spray which descends over the tube bundles of both the first stage and second stage of the main heat exchanger. The rewarmed refrigerant is removed in line 44 at the base of the main heat exchanger 14 for recycle within the closed cycle of the low level refrigerant. It will be noted that the entire heat exchange duty for the liquefaction of the natural gas is done against the low level refrigerant and the high level refrigerant is not utilized to perform refrigeration duty on the natural gas stream.

A high level refrigerant, which is utilized at a refrigeration duty temperature significantly above that of the low level refrigerant, constitutes the second of the two closed cycle refrigerant systems. The high level refrigerant is utilized only to cool the low level refrigerant in indirect heat exchange. The high level refrigerant does not perform a cooling function on the natural gas which is being liquefied. The high level refrigerant typically contains ethane and propane as a multicomponent refrigerant, but may also contain various butanes and pentanes to provide a mixed component refrigerant with the particular refrigeration duty requirements for a particular installation. This high level refrigerant is introduced at various pressure levels into a multistage compressor 46. The high level refrigerant in the vapor phase is removed in line 48 at a temperature of approximately 170° F. and a pressure of approximately 350 psia. The refrigerant is aftercooled in heat exchanger 50 against an external cooling fluid, such as ambient temperature water. The high level refrigerant is partially condensed by the external cooling fluid and exits the heat exchanger 50 in line 52 as a vapor and liquid phase mixture. The refrigerant is phase separated in separator 54.

The vapor phase stream in line 76 is removed from the top of the separator 54 and is further compressed in compressor 78 to a pressure of approximately 446 psia. The vapor phase refrigerant is at such a pressure that it can be fully condensed against the ambient external cooling fluid in aftercooling heat exchanger 80. Again, the external cooling fluid is preferably ambient water. The fully condensed refrigerant stream in line 82 is then subcooled by passage through the various stages 26, 28, 30 and 32 of the auxiliary heat exchanger 24. By performing the phase separation in separator 54, the lighter components of the mixed component high level refrigerant are isolated in the vapor phase stream 76 which eventually performs the lowest temperature level of cooling required in stage 32 of the auxiliary heat exchanger 24. This provides an efficient cooling and better utilization of the multicomponent refrigerant. In addition, this capability provides a unique advantage over nonmulticomponent refrigerant processes.

The liquid phase refrigerant stream from separator 54 is removed from the bottom of said separator in line 56. The refrigerant passes through the high level (warm) stage 26 of the auxiliary heat exchanger 24 before being split into a remaining stream 58 and a sidestream 60 which is flashed to reduced temperature and pressure through a valve. The sidestream in line 60 passes countercurrently back through the high level stage 26 to provide the cooling of the refrigerant streams passing in the opposite direction through the same stage. The rewarmed and vaporized refrigerant is returned for recompression in line 62 to the compressor 46.

The remaining liquid phase refrigerant in line 58 passes through intermediate level heat exchanger stage 28 and a second sidestream 66 is removed from the remaining stream 64. The sidestream 66 is flashed to lower temperature and pressure through a valve and passes countercurrently through the intermediate level stage 28 to provide cooling of the refrigerant streams passing in the opposite direction. The rewarmed and vaporized refrigerant is returned in line 68 for recompression in compressor 46.

The remaining liquid phase stream in line 64 further passes through intermediate level stage 30 and is entirely flashed through valve 70 to a lower temperature and pressure before being countercurrently passed through stage 30 to provide the cooling of the refrigerant streams passing in the opposite direction through stage 30. The rewarmed and vaporized refrigerant is returned in line 72 and line 74 for recompression in compressor 46.

The refrigerant stream in line 82 which passes through all of the auxiliary exchanger stages, including stage 32, is flashed through valve 84 to a lower temperature and pressure and also returns countercurrently through that stage to provide the lowest level of cooling in the auxiliary heat exchanger and is returned for recompression in line 86. It is recombined with the refrigerant stream from line 72 in line 74.

The unique manner of operating the high level refrigerant cycle of this dual mixed component refrigerant liquefaction scheme allows the refrigerant composition to be tailored to the particular refrigeration duty in the various stages of the auxiliary heat exchanger. Particularly, the low level cooling duty required in stage 32 is performed by a refrigerant stream which is specifically composed of light molecular weight refrigerant components due to the phase separation occurring in separator 54. However, the full cooling capacity of the ambient cooling fluid is utilized by the further compression in compressor 78 which allows the ambient cooling fluid to fully condense the vapor stream in aftercooling heat exchanger 80. It has been found, that increased efficiencies in refrigeration can be achieved by fully condensing the refrigerant performing the cooling duty in the cycle against the ambient external cooling fluid, such as ambient water.

In addition, the high level refrigeration cycle also separates the refrigerant streams of the liquid phase stream in line 56 as said stream passes through the high and intermediate stages of the auxiliary heat exchanger 24 in such a way as to avoid the isolation of heavy components in the various colder temperature, intermediate stages of the exchanger. By performing the separation of sidestreams 60 and 66 without phase separation, the composition of the stream which performs colder cooling duty in stage 30 is not enriched in heavy components of the refrigerant mix, but rather utilizes the same composition as the previous refrigerant streams 60 and 66. Although the flowscheme of the high level refrigerant cycle is shown using four stages in the auxiliary heat exchanger and a three stage compressor, it is contemplated that fewer or more stages of heat exchange or compression may be found to be desirable for a particular application. However, the principals of initial phase separation, total condensation against ambient cooling fluid and refrigerant stream splitting without further phase separation, will be applicable to such alternate configurations.

The above process, like other similar processes, exhibits a problem in controlling the temperature of the natural gas precooler. The control of temperature in the precooler is essential to avoid the formation of hydrates while, at the same time, maximizing the degree of precooling prior to drying in a fixed adsorbent bed drier. A low feed gas temperature from the precooler is desirable in order to maximize the amount of water which can be condensed and separated from the feed gas, thereby minimizing the water remaining in the gas going to the driers. The degree of precooling directly impacts on the amount of water removed from the natural gas feed in the drier and therefore the size and cost of the drier and its associated regeneration equipment.

Because the temperature control is more complex in mixed refrigerant processes, like the one discussed above, these processes are less reliable, especially during plant operating upsets. As a result, to avoid hydrate formation, the precooling of the feed before drying cannot be made to as cold a temperature as would be possible with the process of the present invention.

Temperature control of the feed gas precooler for process such as are disclosed in U.S. Pat. Nos. 4,339,253 and 4,525,185 typically revolves around the measurement of two variables, e.g. temperature of the mixed refrigerant from the precooler and the temperature of the feed gas from the precooler, to control the flow of the mixed refrigerant through the precooler. Because the composition and the flow of the mixed refrigerant are variables and because the mixed refrigerant boils over a relatively large temperature range, the mixed refrigerant is difficult to control so as to avoid overcooling of the feed gas and thus the formation of hydrates. Hydrates forming in the drier precooler can accumulate and block the feed flow to such an extent that LNG production must be interrupted while the precooler is warmed and the blockage eliminated. The process of the present invention overcomes this difficulty by incorporating a single component refrigerant cycle in order to precool the natural gas feed. The single phase component can be any suitable refrigerant such as propane or a Freon refrigerant.

Figure 2:
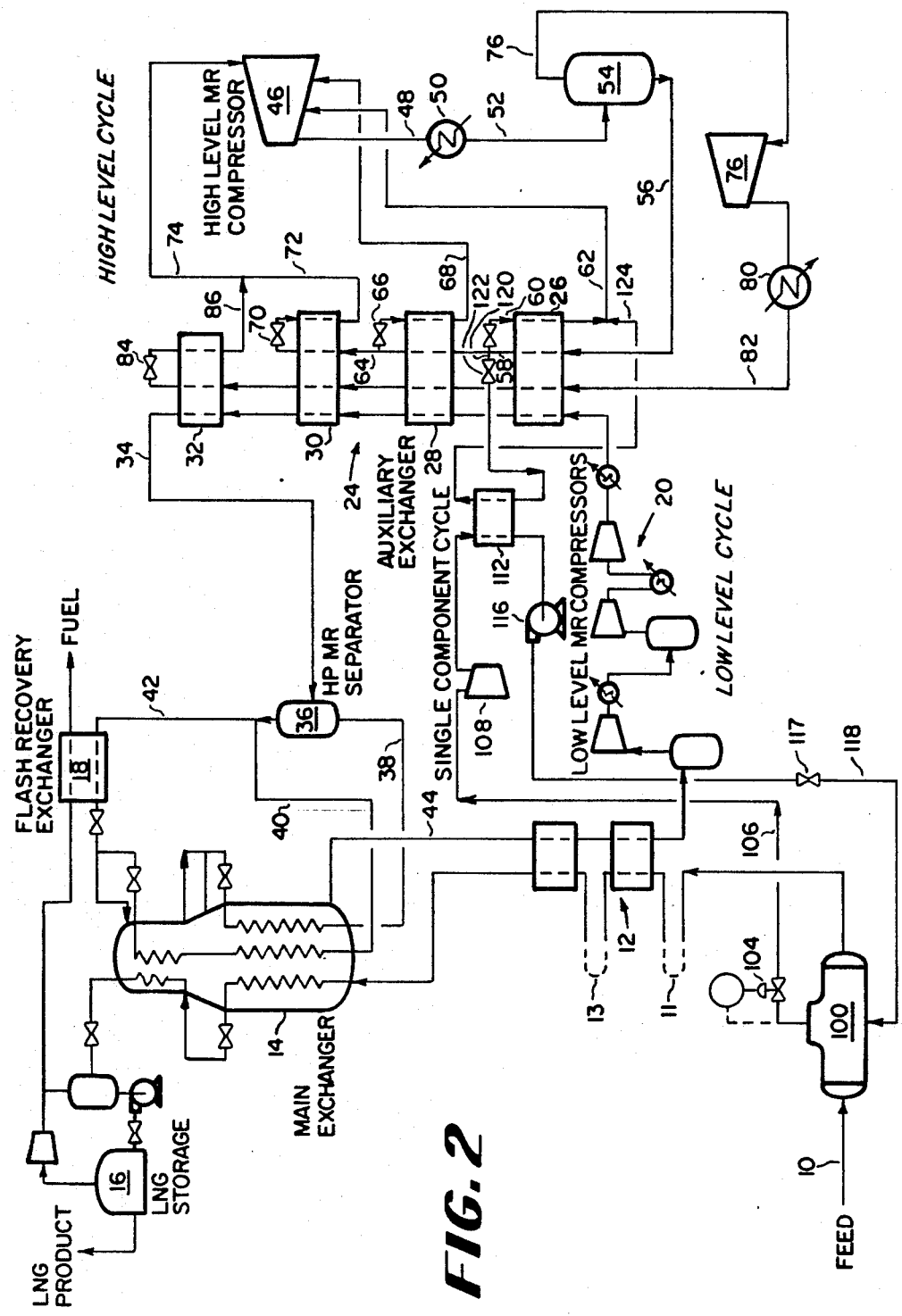
FIG. 2 is a flowscheme of the process of the present invention incorporating a single component, e.g. propane, refrigeration cycle into a natural gas liquefier process utilizing dual multicomponent refrigerant cycles.

One embodiment of the present invention is shown in FIG. 2. In this embodiment, a single component closed-loop refrigeration cycle is added to the prior art dual multicomponent refrigerant liquefaction process to precool the natural gas feed. With reference to FIG. 2, which utilizes identical numbers for common items with FIG. 1, a natural gas feed stream is introduced into the process of the present invention in line 10. This feed, the same as for FIG. 1, is introduced at approximately 93° F. and over 655 psia. The feedstream in line 10 is precooled to 66.3° F. in heat exchanger 100 against a boiling single component refrigerant from a closed-loop single component, e.g. propane, refrigeration cycle and then subjected to further cooling by heat exchange in heat exchanger 12 against a low temperature refrigerant in line 44. The precooled natural gas is circuited through drying and distillation apparatus to remove moisture and higher hydrocarbons. This standard clean-up step is not shown in the drawing other than to indicate that it is generally done prior to liquefaction at stations 11 and 13.

The single component closed-loop refrigeration cycle used to precool the the natural gas feed stream does so by boiling the refrigerant in precooler 100. The temperature in precooler 100 is controlled by controlling the pressure of the boiling single component refrigerant in the precooler, e.g. 112 psia for propane. Although most heat exchanger designs would be applicable for use as precooler 100, the preferred type would be a shell and tube kettle reboiler. In this reboiler heat exchanger, liquid single component refrigerant would be introduced to precooler via line 118; inside precooler 100 the refrigerant would boil through indirect heat exchange with the warm feedstream in line 10. The amount of heat transfer, i.e. the temperature of precooler 100, is controlled by controlling the pressure on the shell side of precooler 100 via pressure valve 104. It is this ability to control temperature by controlling the pressure of the boiling single component refrigerant in the precooler that allows for maximizing water condensation yet prohibiting the formation of hydrates. This ability results in improved drier operation. The vaporized single component refrigerant is removed from precooler 100 via line 106 and optionally compressed in compressor 108. The refrigerant, now in line 110, is condensed in heat exchanger 112 by indirect heat exchange with the high level multicomponent refrigeration cycle in line 124. The condensed refrigerant is then optionally increased in pressure with cold pump 126, flashed in Joule-Thomson valve 117 and recycled back to precooler 100 via line 118. The condensed refrigerant is flashed in Joule-Thomson valve 117 to reduce its temperature and pressure to the appropriate level for precooling in precooler 100. In increasing the pressure of the single component refrigerant, one of three methods can be used, (1) the pressure increase can come from compressing the vaporized refrigerant in compressor 108; (2) the pressure increase can come from pumping the condensed refrigerant in cold pump 116; or (3) the pressure increase can come from both compressing the vaporized refrigerant in compressor 108 and pumping the condensed refrigerant in cold pump 116. This increase in pressure can come before or after the condensing step. The preferred mode of operation would be determined by the cooling curves of the high level refrigerant.

The only other modification to the process of FIG. 1 in the present invention comes in the high level multicomponent refrigeration cycle. Wherein, the liquid phase refrigerant stream from separator 54 is removed from the bottom of said separator in line 56. The refrigerant passes through the high level (warm) stage 26 of the auxiliary heat exchanger 24 before being split into a remaining stream 58, a sidestream 60 which is flashed to reduced temperature and pressure through a valve, and a sidestream 120 which is flashed through Joule-Thomson valve 122 to a reduced pressure and temperature.

The sidestream in line 120 is used to cool stream 110 of the single component refrigeration cycle in heat exchanger 112. The warmed sidestream, now in line 124, is combined with the sidestream in line 60 to form stream 62. The sidestream in line 60 passes countercurrently back through the high level stage 26 to provide the cooling of the refrigerant streams passing in the opposite direction through the same stage. The rewarmed and vaporized refrigerant in line 62 is recompressed in compressor 46.

The remainder of the dual multicomponent refrigeration cycle embodiment of the present invention is identical to that disclosed in FIG. 1 and its supporting discussion.

Figure 3:
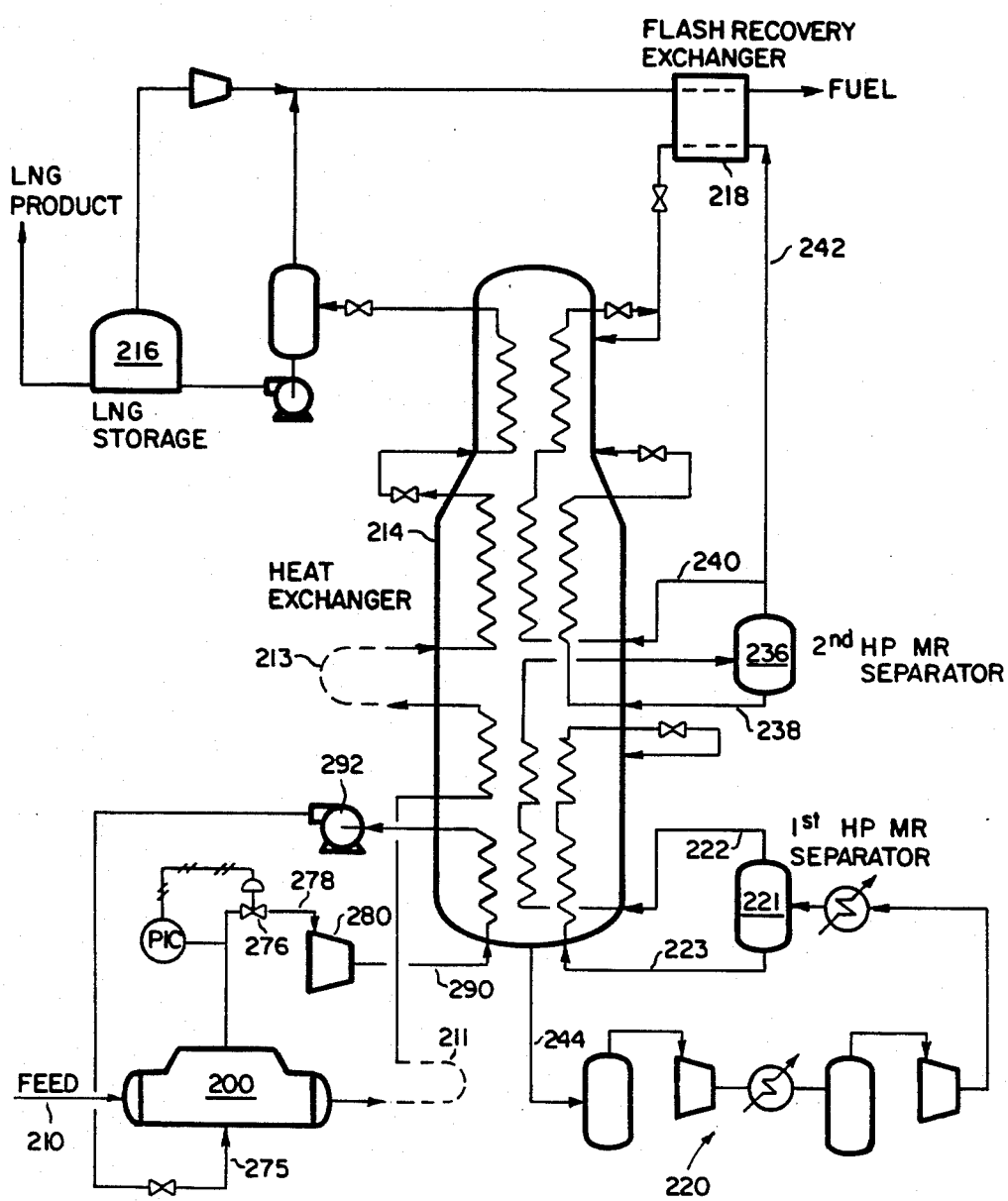
FIG. 3 is a flowscheme of the process of the present invention incorporating a single component, e.g. propane, refrigeration cycle into a natural gas liquefier process utilizing a single multicomponent refrigerant cycle.

Another embodiment of the present invention is shown in FIG. 3. In this embodiment, a single component, e.g. propane, closed-loop refrigeration cycle is added to a prior art single multicomponent refrigerant liquefaction process to precool the natural gas feed. With reference to FIG. 3, a natural gas feedstream in line 210 is subjected to initial cooling by heat exchange in heat exchanger 200 against a single component refrigerant in line 275. The precooled natural gas is circuited through drying and distillation apparatus to remove moisture and higher hydrocarbons. This standard clean-up step is not shown in the drawing other than to indicate that it is generally done prior to liquefaction at stations 211 and 213.

The single component closed-loop refrigeration cycle used to precool the the natural gas feed stream does so by boiling the refrigerant in precooler 200. The temperature in precooler 200 is controlled by controlling the pressure of the boiling single component refrigerant in the precooler. Although most heat exchanger designs would be applicable for use as precooler 200, the preferred type would be a shell and tube kettle reboiler. In this reboiler heat exchanger, liquid single component refrigerant would be introduced to precooler via line 275, inside precooler 200 the refrigerant would boil through indirect heat exchange with the warm feedstream in line 210. The amount of heat transfer, i.e. the temperature of precooler 200, is controlled by controlling the pressure on the shell side of precooler 200 via backpressure valve 276. It is this ability to control temperature by controlling the pressure of the boiling single component refrigerant in the precooler that allows for maximizing water condensation yet prohibiting the formation of hydrates. This ability results in improved drier operation. The vaporized single component refrigerant is removed from precooler 200 via line 278 and optionally compressed in compressor 280. The refrigerant, now in line 290, is condensed in heat exchanger 214 by indirect heat exchange with the multicomponent refrigeration cycle. The condensed refrigerant is then increased in pressure with cold pump 292 and recycled back to precooler 200 via line 275. In increasing the pressure of the single component refrigerant, one of three methods can be used, (1) the pressure increase can come from compressing the vaporized refrigerant in compressor 280; (2) the pressure increase can come from pumping the condensed refrigerant in cold pump 292; or (3) the pressure increase can come from both compressing the vaporized refrigerant in compressor 280 and pumping the condensed refrigerant in cold pump 292. The preferred mode of operation would be using pumping.

The natural gas, now free of moisture and significantly reduced in higher hydrocarbons, is then cooled and totally condensed in the main heat exchanger 214. The liquefied natural gas is then subcooled. The liquefied natural gas then leaves the exchanger 214, is flashed through a valve and is phase separated to provide flash gas and product liquefied natural gas which is pumped to a storage containment 216. LNG product can then be removed as desired. Vapor forming over the stored LNG is compressed to pressure and combines with the flash gas to be rewarmed in flash gas recovery exchanger 218 before being used as fuel.

The process of FIG. 3 involves the liquefaction of natural gas using one closed cycle multicomponent refrigerant, which provides the lowest temperature level of refrigerant for the liquefaction of the natural gas.

The multicomponent refrigerant, which actually performs the cooling, liquefaction and subcooling of the natural gas, is typically comprised of nitrogen, methane, ethane, propane and butane. The exact concentration of these various components in the multicomponent refrigerant is dependent upon the ambient conditions and particularly, the temperature of external cooling fluids, which are used in the liquefaction plant and the natural gas feed composition.

The multicomponent refrigerant is compressed in multiple stages and aftercooled against external cooling fluid in compressor assembly 220. Ambient cooling fluid, such as sea water, is usually utilized to remove the heat of compression.

The refrigerant is then phase separated in separator 221 into a liquid phase and a vapor phase. The liquid phase of the multicomponent refrigerant is removed in line 223 and introduced into main heat exchanger 214 for further cooling before being removed from the exchanger, reduced in temperature and pressure through a valve and reintroduced into a lower portion of the shell side of the exchanger as a spray which descends over the various tubes in the lower portion of the main heat exchanger. The vapor phase stream from separator 221 is introduced into main exchanger 214 where it is cooled and partially condensed. This partially condensed vapor phase is then separated in separator vessel 236. The liquid phase of the multicomponent refrigerant is removed in line 238 and introduced into main heat exchanger 214 for further cooling before being removed from the exchanger, reduced in temperature and pressure through a valve and reintroduced into an upper portion of the shell side of the exchanger as a spray which descends over the various tubes in the main heat exchanger. The vapor phase stream from separator 236 is split into a slipstream 242 and the main vapor stream 240. The main vapor stream 240 is also introduced into the main heat exchanger 214 where it is fully liquefied and subcooled before it is removed for reduction in temperature and pressure through a valve. The slipstream of the vapor phase in line 242 passes through flash recovery heat exchanger 218 to recover refrigeration duty from the flash natural gas. This stream is also reduced in temperature and pressure and is combined with the stream in line 240 and is introduced into the overhead of the main heat exchanger 214 as a spray which descends over the tube bundles of both the first stage and scond stage of the main heat exchanger. The rewarmed refrigerant is removed in line 244 at the base of the main heat exchanger 14 for recycle within the closed cycle of the multicomponent refrigerant.

The present invention has been described with reference to two specific embodiments thereof, these descriptions should not be viewed a limitation on the present invention, the scope of which should be ascertained by the following claims.

We claim:

1. In a process for the liquefaction of a natural gas feedstream using two closed cycle, multicomponent refrigerants wherein a high level refrigerant cools a low level refrigerant and the low level refrigerant cools and liquefies the natural gas feedstream, the improvement comprising:
   precooling the natural gas feedstream so as to prevent the formation of hydrates by heat exchange of the natural gas feedstream with a boiling single component refrigerant in a precooler thereby producing a vaporized refrigerant wherein the temperature of the precooler is controlled by controlling the pressure on said boiling
   single component refrigerant in the precooler; increasing in pressure and condensing said vaporized refrigerant in heat exchange with said high level multicomponent refrigerant; and
   flashing said condensed refrigerant and returning said flashed refrigerant as recycle to said precooler.

2. The process of claim 1 wherein the increasing of pressure of the single component refrigerant is accomplished by compressing said refrigerant prior to condensing by heat exchange against the high level multicomponent refrigerant.

3. The process of claim 1 wherein the increasing of pressure of the single component refrigerant is accomplished by pumping said refrigerant after condensing by heat exchange against the high level multicomponent refrigerant.

4. The process of claim 1 wherein the increasing of pressure of the single component refrigerant is accomplished by both compressing said vaporized refrigerant prior to condensing by heat exchange with said high level multicomponent refrigerant and pumping said refrigerant after condensing against the high level multicomponent refrigerant.

5. In a process for the liquefaction of a natural gas feedstream using one closed cycle, multicomponent refrigerant wherein said refrigerant cools and liquefies the natural gas, the improvement comprising:
   precooling the natural gas feedstream so as to prevent the formation of hydrates while yet maximizing the removal of water by condensation in the natural gas feedstream by heat exchange of the natural gas feedstream with a boiling single component refrigerant in a precooler thereby producing a vaporized refrigerant wherein the temperature of the precooler is controlled by controlling the pressure on said boiling single component refrigerant in the precooler;
   increasing in pressure and condensing said vaporized refrigerant in heat exchange with said multicomponent refrigerant; and
   flashing said condensed refrigerant and returning said flashed refrigerant as recycle to said precooler.

6. The process of claim 5 wherein the increasing of pressure of the single component refrigerant is accomplished by compressing said refrigerant prior to condensing by heat exchange against the multicomponent refrigerant.

7. The process of claim 5 wherein the increasing of pressure of the single component refrigerant is accomplished by pumping said refrigerant after condensing by heat exchange against the multicomponent refrigerant.

8. The process of claim 5 wherein the increasing of pressure of the single component refrigerant is accomplished by both compressing said vaporized refrigerant prior to condensing by heat exchange with said high level multicomponent refrigerant and pumping said refrigerant after condensing against the multicomponent refrigerant.

9. In a process for the liquefaction of a natural gas feedstream using two closed cycle, multicomponent refrigerants wherein a high level refrigerant cools a low level refrigerant and the low level refrigerant cools and liquefies the natural gas feedstream, comprising;
   cooling and liquefying a natural gas stream by heat exchange with a low level multicomponent refrigerant in a first closed refrigeration cycle, which refrigerant is rewarmed during said heat exchange,
   compressing said rewarmed low level refrigerant to an elevated pressure and aftercooling it against an external cooling fluid,
   further cooling said low level refrigerant by multiple stage heat exchange against a high level multicomponent refrigerant in a second closed refrigeration cycle, which high level refrigerant is rewarmed during said heat exchange,
   compressing said rewarmed high level refrigerant to an elevated pressure and aftercooling it against an external cooling fluid to partially liquefy said refrigerant,
   phase separating said high level refrigerant into a vapor phase refrigerant stream and a liquid phase refrigerant stream,
   subcooling and expanding portions of the liquid phase refrigerant stream to lower temperature and pressure in multiple stages to provide the cooling of the low level refrigerant and to cool and liquefy the vapor phase refrigerant stream, and
   compressing the vapor phase refrigerant stream and condensing it against an external cooling fluid, before subcooling it against the liquid phase stream and expanding it to lower temperature and pressure to provide the lowest stage of cooling to the low level refrigerant,
   the improvement comprising:
   precooling the natural gas feedstream so as to prevent the formation of hydrates by heat exchange of the natural gas feedstream with a boiling single component refrigerant in a precooler thereby producing a vaporized refrigerant wherein the temperature of the precooler is controlled by controlling the pressure on said boiling single component refrigerant in the precooler;
   increasing in pressure and condensing said vaporized refrigerant in heat exchange with said high level multicomponent refrigerant; and
   flashing said condensed refrigerant and returning said flashed refrigerant as recycle to said precooler.

10. The process of claim 9 wherein the increasing of pressure of the single component refrigerant is accomplished by compressing said refrigerant prior to condensing by heat exchange against the high level multicomponent refrigerant.

11. The process of claim 9 wherein the increasing of pressure of the single component refrigerant is accomplished by pumping said refrigerant after condensing by heat exchange against the high level multicomponent refrigerant.

12. The process of claim 9 wherein the increasing of pressure of the single component refrigerant is accomplished by both compressing said vaporized refrigerant prior to condensing by heat exchange with said high level multicomponent refrigerant and pumping said refrigerant after condensing against the high level multicomponent refrigerant.

* * * * *